No. 692,402. Patented Feb. 4, 1902.
H. G. WITT.
WIRELESS CORN PLANTER.
(Application filed Sept. 10, 1901.)
(No Model.) 2 Sheets—Sheet 1.
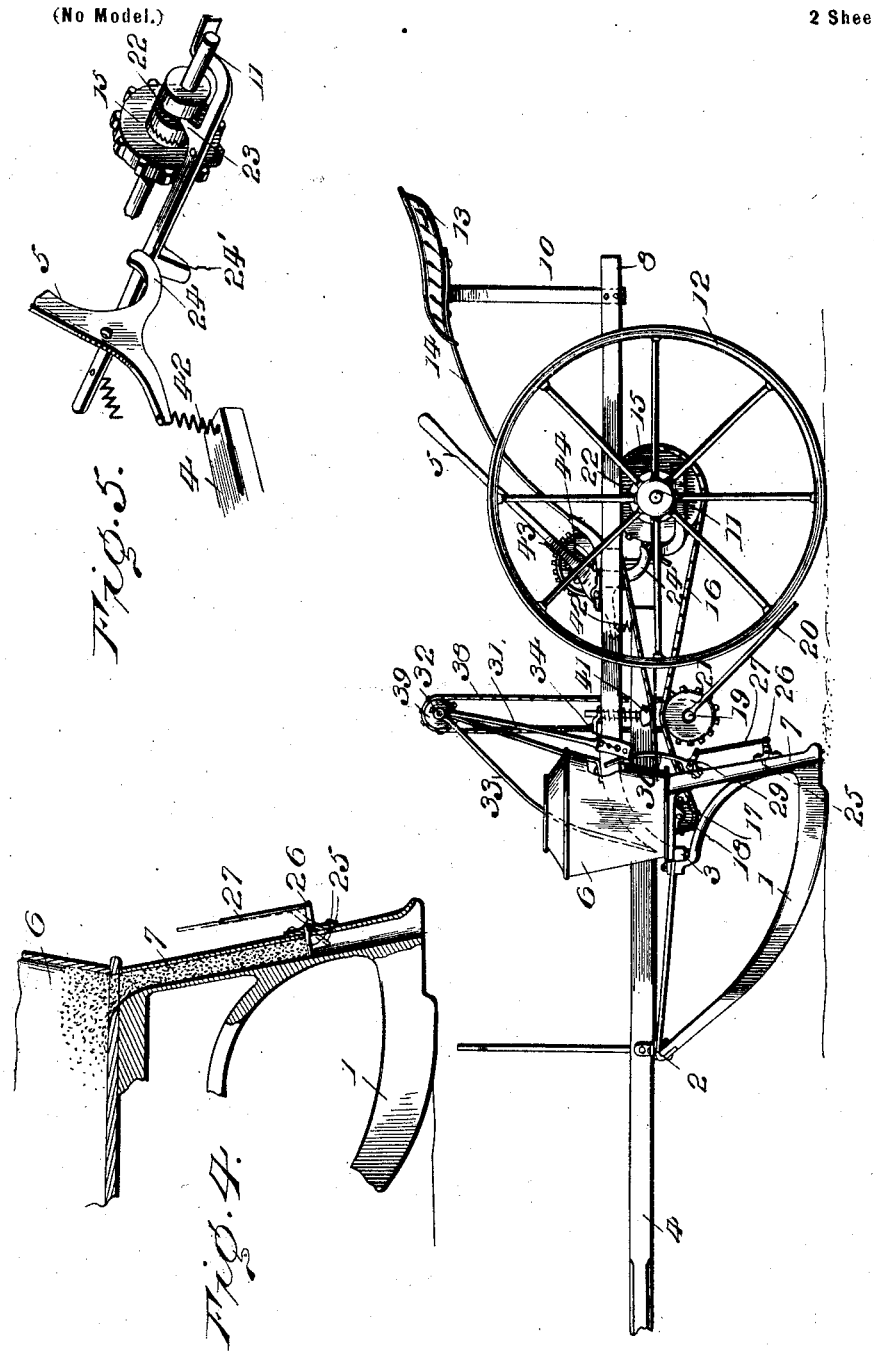
Witnesses
Inventor
Henry G. Witt.
Attorneys No. 692,402.  
H. G. WITT.  
WIRELESS CORN PLANTER.  
(Application filed Sept. 10, 1901.)
Patented Feb. 4, 1902.
(No Model.)
2 Sheets—Sheet 2.
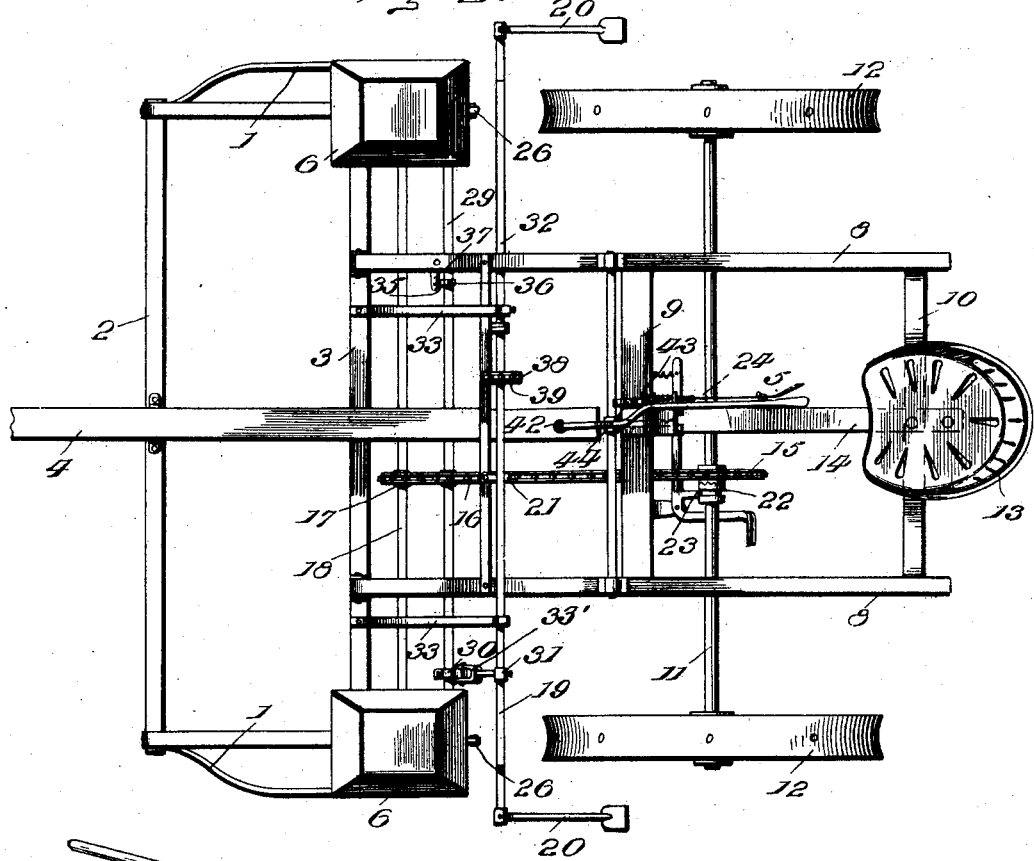

UNITED STATES PATENT OFFICE.

HENRY G. WITT, OF GRAFTON, IOWA.

WIRELESS CORN-PLANTER.

SPECIFICATION forming part of Letters Patent No. 692,402, dated February 4, 1902.

Application filed September 10, 1901. Serial No. 74,912. (No model.)

*To all whom it may concern:*

Be it known that I, HENRY G. WITT, a citizen of the United States, residing at Grafton, in the county of Worth and State of Iowa, have invented a Wireless Corn-Planter, of which the following is a specification.

This invention has relation to planters, and most especially to the type designed for sowing seed in check-rows without the intervention of a check-line, as generally used in connection with implements of the character aforesaid.

The invention has for its object to improve the general construction and deals most especially with the mechanism whereby the depth of planting the seed is regulated, the runner-frame elevated, and the planter mechanism simultaneously thrown out of gear.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a planter embodying the essential features of the invention. Fig. 2 is a top view thereof. Fig. 3 is a perspective view to show more clearly the relation and construction of the parts entering into the formation of the actuating mechanism. Fig. 4 is a detail view in section of the spout at the rear end of a runner, showing its relation to the hopper and the valve coöperating therewith. Fig. 5 is a detail view in perspective of the lever for raising and lowering the runner-frame and simultaneously throwing the actuating mechanism out of gear when the runner-frame is lifted.

Corresponding and like parts are referred to in the following description and indicated in all the views of the drawings by the same reference characters.

The planter comprises the usual runner and wheel frames flexibly connected, so as to admit of their ready conformation to the surface condition of the ground over which the implement is drawn.

The runner-frame comprises runners 1 and cross-bars 2 and 3 connecting the runners. The pole or tongue 4 is located centrally of the runner-frame and is attached to the cross-bars 2 and 3 and projects in the rear of the said runner-frame for connection with the hand-lever 5, by means of which the runner-frame is raised and lowered and the actuating mechanism thrown out of gear. Hoppers 6 are supported at the rear corners of the runner-frame, and the discharge-openings therein communicate with spouts 7 at the rear ends of the runner 1 for conveyance of the grain to the furrows made by the openers.

The wheel-frame comprises longitudinal bars 8, cross-bars 9 and 10, axle 11, and ground-wheels 12. The forward ends of the longitudinal bars 8 curve downward and have pivotal connection with the runner-frame in any selected way, so as to admit of the independent movement of the runner and wheel frames when passing over uneven ground. The driver's seat 13 is secured to the rear end of a curved bar or support 14, attached at its lower end to a convenient portion of the wheel-frame, as the cross-bar 9. A sprocket-wheel 15 is secured to the axle 11, so as to rotate therewith, and a drive-chain 16 connects the sprocket-wheel 15 with a sprocket-pinion 17, secured to the shaft 18, journaled on the runner-frame transversely to the line of motion of the machine, and which shaft actuates the seed-dropping mechanism of ordinary construction, so as to effect a positive discharge of the seed from the hoppers in the spouts 7. The marker-shaft 19 is journaled in bearings applied to the wheel-frame and parallels the shaft 18 and axle 11, and is provided at its ends with markers 20 for indicating the hill of corn or place of deposition of the seed, thereby assisting in setting the seed-dropping mechanism so as to plant the seed in straight lines and check-rows. A sprocket-wheel 21 is secured to the marker-shaft 19 and its teeth are in meshing relation with the links of the drive-chain 16, so as to be actuated thereby. A clutch 22 is provided for throwing the gear-wheel 15 into and out of engagement with the axle 11, and this clutch is controlled by a shipper-lever 23, adapted to be actuated either by the foot of the driver for throwing the mechanism out of gear at any time or by means of the lever 5, whereby when the runner-frame is lifted the actuating mechanism is simultaneously thrown out of gear by contact of a part 24 of the lever 5 with a cam 24' on the shipper-lever 23.

The passage of the seed through the spouts 7 is controlled by means of valves 25, having rearwardly-extending stems 26, which are connected by means of links 27 with arms 28, projected rearwardly from a shaft 29, paralleling the shafts 18 and 19 and journaled in the runner-frame. A spring-arm 30 is secured to the shaft 29 and extends in an upward direction therefrom within the path of an arm 31, secured to a transverse shaft 32, journaled in standards 33, attached at their lower ends to parts of the runner-frame. The arm 31 is forked at its lower end, as shown at 33', and the forked sides are provided with a series of openings in transverse alinement for the reception of a pin 34, which engages with the arm 30 and trips the same to effect a rocking of the shaft 29, whereby the valves 25 are actuated to release the seed confined in the spouts 7 and admit of the discharge thereof. The shaft 29 and valves 25, connected therewith, are returned to a normal position by means of a spring 35, connected at its lower end to an arm 36 of the shaft 29 and at its upper end to a projection 37 of the wheel-frame. The shaft 32 is driven from any convenient rotating part of the machine, and, as shown, a drive-chain 38 connects a sprocket-wheel 39 of the shaft 32 with a sprocket-wheel 40, attached to the shaft 19. By shifting the pin 34 into one or the other of the openings in the forked sides 33' the arm 30 is tripped, more or less, to regulate the amount of grain dropped in a hill.

A spring-actuated presser 41 bears upon the upper portion of the drive-chain 16 and automatically takes up any slack therein, thereby assisting in holding the lower run of the drive-chain 16 in contact with the teeth of the sprocket-wheel 21. The lever 5 extends within convenient reach of the driver's seat, so as to be operated therefrom, and its lower end is connected by means of a spring 42 at the rear end of the pole or tongue 4 and admits of a limited play of the runner-frame, which is essential to obviate breakage or serious injury when a runner passes over a stone, root, or other unyielding obstruction. This lever is provided with the usual hand-latch 43 for engagement with a notched segment 44 for holding the runner-frame at any adjusted position. The lever 5 has an extension 24 for contact with the shipper-lever 23 to throw the actuating mechanism out of gear simultaneously with lifting the runner-frame out of contact with the ground.

Having thus described the invention, what is claimed as new is—

1. In a planter, and in combination with the grain-spout, a valve for controlling the passage therethrough, and an arm connected with the said valve, a rotary shaft, an arm connected with the shaft for rotation therewith and forked at its outer end, and a pin having adjustable connection with the forked sides and adapted to intermittently actuate the aforementioned trip-arm, substantially as set forth.

2. In a planter, the combination of hoppers, grain-spouts leading therefrom, valves in the grain-spouts, a trip-arm connected with the said valves, a shaft, an arm connected with the said shaft for rotation therewith, a pin adapted to have adjustable connection with the said arm for actuating the trip-arm to regulate the amount of grain dropped in a hill, a marker-shaft connected with the aforementioned shaft, a drive-shaft for actuating the operating parts, a clutch for throwing the drive mechanism into and out of gear, a shipper-lever at all times under control of the driver, and a hand-lever for raising and lowering the runner-frame and adapted to actuate the shipper-lever, substantially as set forth.

In testimony whereof I have signed my name to this specification in the presence of two subscribing witnesses.

HENRY G. WITT.

Witnesses:
 E. BABRE,
 E. L. BARLOW.